May 9, 1933.    J. G. BLUNT    1,907,485
LOCOMOTIVE VALVE GEAR AND OPERATING MECHANISM THEREFOR
Filed Jan. 14, 1931   3 Sheets-Sheet 2
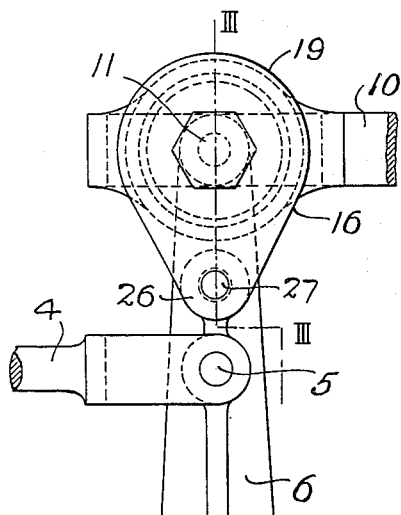
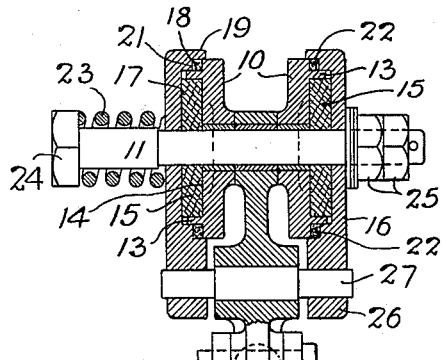
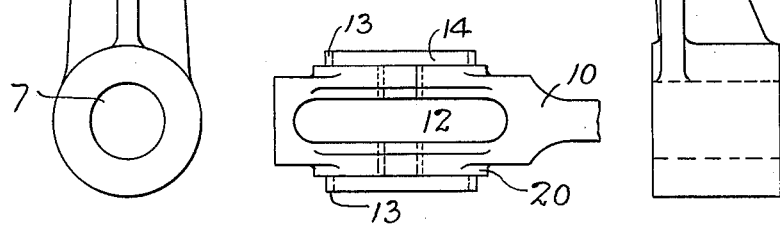
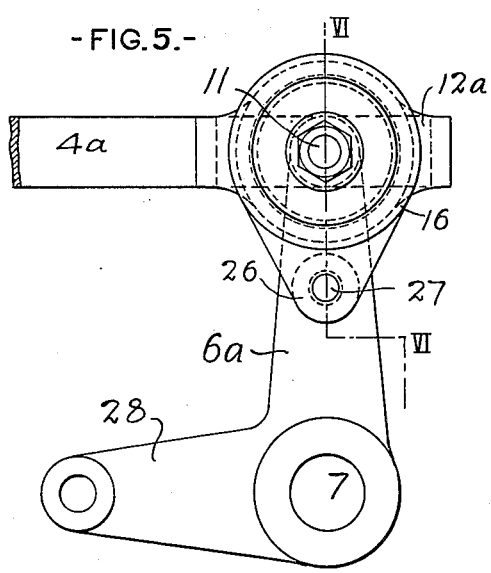
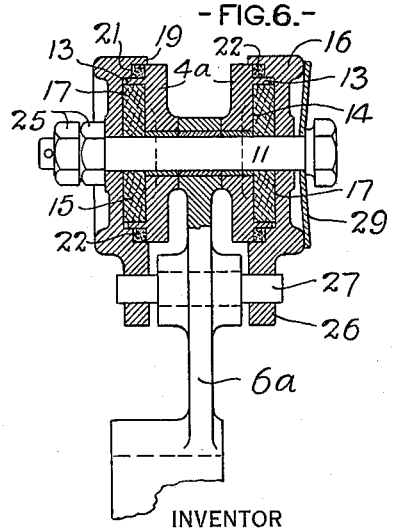
INVENTOR
James G. Blunt.
BY
ATTORNEY May 9, 1933.   J. G. BLUNT   1,907,485
LOCOMOTIVE VALVE GEAR AND OPERATING MECHANISM THEREFOR
Filed Jan. 14, 1931   3 Sheets-Sheet 3
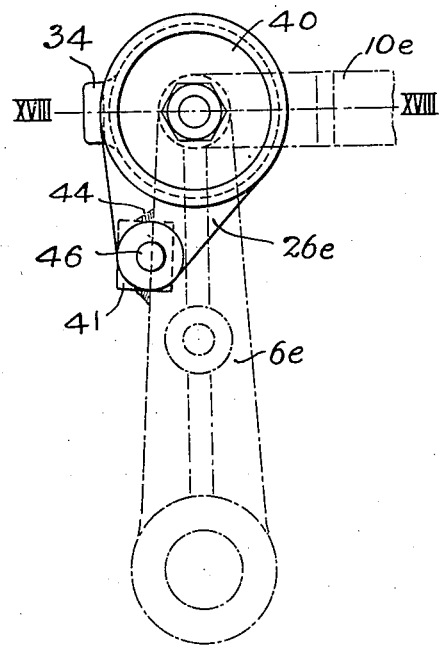
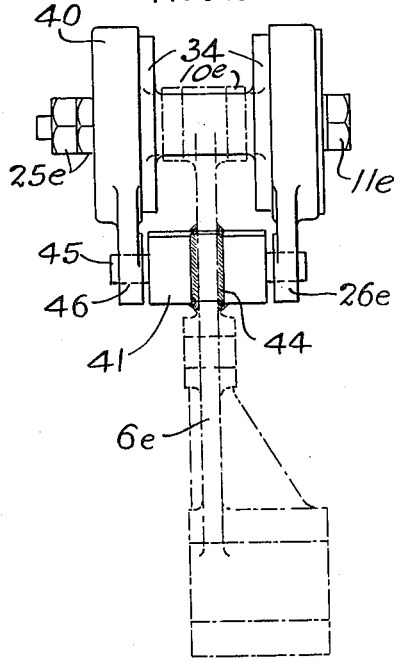
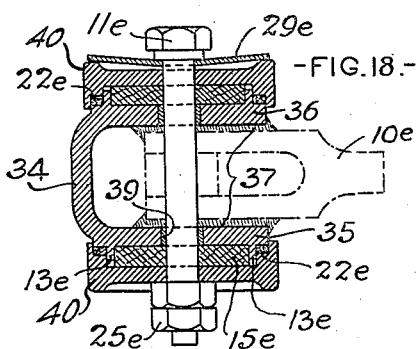
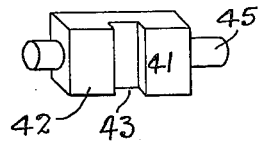
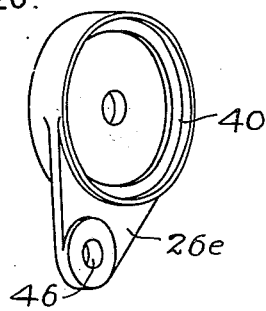
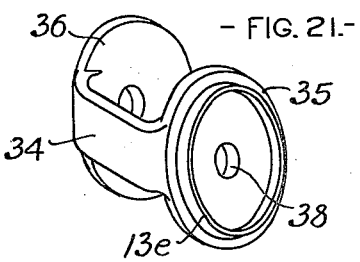
INVENTOR
James G. Blunt
BY
ATTORNEY Patented May 9, 1933

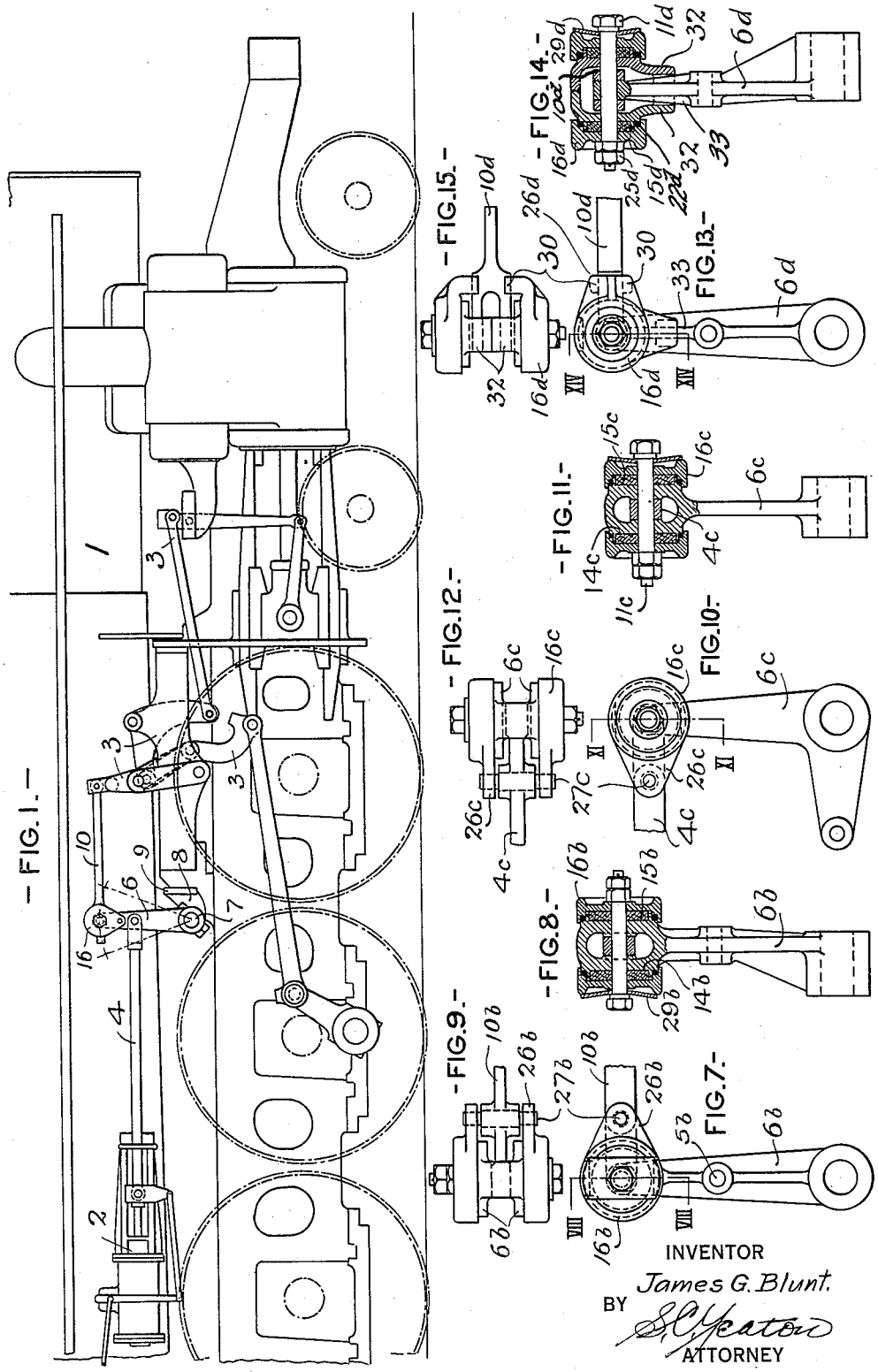

1,907,485

UNITED STATES PATENT OFFICE

JAMES G. BLUNT, OF SCHENECTADY, NEW YORK

LOCOMOTIVE VALVE GEAR AND OPERATING MECHANISM THEREFOR

Application filed January 14, 1931. Serial No. 508,692.

This invention relates generally to the class or type of appliance known as locomotive valve gears and operating mechanisms therefor.

The object of the invention is to provide a structure for dampening the reciprocating inertia shocks caused by reversals of the valve gear and prevent their being transmitted to the control mechanism. In locomotive practice a well recognized problem has been presented by these inertia shocks imposed on the valve gear which increases with the speed of the locomotive. These shocks are in turn transmitted to the reverse gear mechanism and tend to spring fracture or disturb the proper functioning of the valve gear mechanism. The present invention embodies a friction means for dampening the shocks before they can reach and effect the reverse gear mechanism and disturb the proper functioning of the valve gear.

Further objects which have been achieved by this invention are the provisions for a structure adaptable to the aforesaid purpose which is characterized by sturdiness and efficiency, which is compact and capable of application to existing valve gear mechanisms, and which is housed and fully protected from moisture, oil or other foreign substances which might effect the degree of friction obtainable.

The invention is illustrated in the accompanying drawings, in which Figure 1 is a side view of a part of a locomotive, equipped with a valve gear of the Baker type showing the invention applied thereto, which is equally applicable to other types; Fig. 2 is a side view, on an enlarged scale, of a reverse shaft arm and valve gear operating rod with the invention applied thereto; Fig. 3 is a sectional view on the line III—III of Fig. 2; Fig. 4 is a plan view of the end of the valve gear operating rod shown in Fig. 2; Fig. 5 is a side view of a modification of the structure illustrated in Fig. 2, (suitable for an engine equipped with a valve gear of the Walschaert type); Fig. 6 is a sectional view on the line VI—VI of Fig. 5; Fig. 7 is a side view of a modification of the structure of Fig. 2, (applicable to a gear of the Baker type), illustrating a modified arrangement of the friction arms; Fig. 8 is a sectional view taken on the line VIII—VIII of Fig. 7; Fig. 9 is a plan view of Fig. 7; Fig. 10 is a side view of a modification of the structure shown in Fig. 5, illustrating a modified arrangement of the friction arms; Fig. 11 is a sectional view on the line XI—XI of Fig. 10; Fig. 12 is a plan view of Fig. 10; Fig. 13 is a side view of a reverse shaft arm and valve gear operating rod showing a modified form of the invention applied thereto, such as is suitable for application to an existing valve gear mechanism; Fig. 14 is a sectional view on the line XIV—XIV of Fig. 13; Fig. 15 is a plan view of Fig. 13; Fig. 16 is a side view of a reverse shaft arm and valve gear operating rod showing another modified form of the invention applied thereto, also suitable for application to an existing valve gear mechanism; Fig. 17 is a rear view of Fig. 16; Fig. 18 is a section on the line XVIII—XVIII of Fig. 16; Fig. 19 is a perspective view of the anchor employed in the said last modified structure; Fig. 20 is a similar view of one of the friction arms of said structure; and Fig. 21 is a similar view of the yoke embodied in said structure.

In the practice of the invention referring descriptively to the specific embodiment thereof which is herein exemplified, a locomotive (Fig. 1) which is indicated generally by the numeral 1, is provided with a reverse gear 2, and a valve gear 3, both suitably connected thereto in the usual manner. A reach rod 4, is operably connected at its rear end to the reverse gear 2, and at its forward end is pivotally connected, by a pin 5, to a reverse shaft arm 6, which is keyed in the usual manner to a reverse shaft 7, having a bearing 8 formed on a frame cross tie member 9. A valve gear operating rod 10 is operably connected, in the usual manner, at its forward end to the valve gear 3. Referring more particularly to Figs. 1-4, the rear end of the valve gear operating rod 10 is formed with an eye 12 for the reception of the upper end of the reverse shaft arm 6. The projecting sides 20 have circular flanges 13, formed on the outer faces of the circular end 20 of rod 10, at its rear end, spaced inwardly from the edges thereof, thereby providing circular pockets 14 for the reception of friction discs 15 formed of any suitable material. Friction arms 16 are disposed adjacent the outer faces of the rear end of the rod 10. The friction arms are provided with circular depressions 17 in their inner faces into which the flanges 13 extend, thereby providing a complete housing for the friction discs 15. At the outer periphery of the circular depressions 17 circular depressions 18, of lesser depth than the depressions 17 are formed, thereby providing collars 19 which are adapted to overlap the circular projections 20 formed on the outer surfaces of the end of the rod 10, so as to provide a seat 21 for rings of packing 22.

A pin 11 passes through the reverse shaft arm 6, the end of the valve gear operating rod 10, the two friction discs 15 and the two friction arms 16. A coil spring 23 is disposed at one end of the pin 11 being held in place by the head 24, and compresses the friction discs 15 upon the drawing up of nuts 25, provided at the opposite end of the pin 11. The two arms 16 are thus clamped tightly against the friction discs 15 and the latter are forced against the outer faces of the rod 10 within the depressions 14, thereby providing a definitely fixed friction connection. The friction arms are provided with extensions 26 which are coupled to the reverse shaft arm 6 by a pin 27 passed transversely through the reverse shaft arm and the extensions 26 of the arms 16. A slight clearance is provided between the inner faces of the extensions 26 and the adjacent sides of the reverse shaft arm 6, and the pin 27 engages the extensions 26 so as to permit free movement of the arms relative to the pin axially thereof, while the pin holds the extensions so as to move the arms with the reverse shaft arm and pivotally rotate the same about the pin 11, upon change in the angular relation of the reverse shaft arm of the valve gear operated arm. By the permitted lateral movement of the arms (that is axially of the pins 11 and 27) any space resulting from wear of the friction discs will thus be automatically taken up, so that the spring will at all times effect a positive pressure of the arms against the friction members dependent in degree upon the tension of spring 23, which is made adjustable by nuts 25. It will thus be seen that any movement, or change in the angular relation between the valve gear operating rod 10 and the reverse shaft arm 6, will be resisted by the friction of the discs 15 on the opposing adjacent faces of the valve gear operating rod and the friction arms 16, and that thereby any shocks of the valve gear mechanism will be dampened and their transmission from that point to the reverse gear will be largely prevented. The packing arrangement, which is not essential but may be used when desired, provides a seal against the weather, moisture, oil or other foreign substances protecting the friction disc therefrom, so that the degree of friction provided by the disc, will be unaffected by such influences.

Referring to Figures 5 and 6, the dampening mechanism is here illustrated as applied to a reverse shaft arm, such as used with a gear of the Walschaert type. Here the reverse shaft arm 6a is shown with a lift shaft arm 28, integrally formed thereon, of the usual type and construction. The reach rod 4a which operates the reverse shaft arm, is provided with an eye 12a and is formed in the same manner as the rear end of the valve gear operating rod 10 of the construction illustrated in the Figures 2 to 4, and is attached to the arm 6a in the same manner as the rod 10 is attached to the arm 6 in the aforesaid construction, the friction discs and friction arms being similarly applied thereto. In this construction a spring plate 29 is provided in place of the coil spring 23 serving the same function as the coil spring, the pin 11 passing through the plate and compressing the same against the outer surface of a friction arm.

Referring to Figures 7, 8 and 9, the invention is here illustrated in a modified form, of similar type to that illustrated and described with reference to Figures 1 to 4. Here the upper end of the reverse shaft arm 6b is formed in the same manner as the rear end of the valve gear operating rod 10 (Fig. 4) and the rear end of the valve gear operating rod 10b is formed similarly to the upper end of the reverse shaft arm 6 (Figs. 2 and 3). The friction arms 16b are disposed over the pockets 14b formed in the outer faces of the ends of the reverse shaft arm 6b and the extensions 26b are coupled to the rod 10b by pin 27b. A bearing 5b is provided for the attachment of a reach rod in the usual manner. A spring plate 29b is provided in the same manner as illustrated and described with reference to Figs. 5 and 6.

Referring to Figs. 10, 11 and 12, the invention is here illustrated in a modified form, of a type similar to the structure illustrated and described with reference to Figs. 5 and 6. In this modification the upper end of the reverse shaft arm 6c is constructed similarly to the rear end of the valve gear operating rod 10, and the forward end of the reach rod 4c is constructed similarly to the upper end of the reverse shaft arm 6 illustrated and described with reference to Figs. 2 and 3. The friction arm extensions 26c extend laterally to the rear and are coupled to the reach rod 4c by means of a pin 27c, the lower end of the reverse shaft arm 6c being similarly formed to the reverse shaft arm 6a of Fig. 5.

Referring to Figs. 13, 14 and 15, a modified form of the invention is here illustrated which is applicable as an attachment to a reverse shaft arm and valve gear operating rod on an existing valve gear structure of the usual type. Here, the upper end of the reverse shaft arm 6d and the rear end of the valve operating rod 10d are pivotally coupled together in the usual manner by a pin 11d. A pair of arm members 32 is disposed on opposite sides of the ends of the operating rod 10d and are similarly formed on their outer faces to the ends of the rod 10 as illustrated in Fig. 3. The lower ends of the members 32 are channelled on their inner faces, the channels corresponding with ribs 33 formed on the sides of the reverse shaft arm 6d, the members 32 being held in position thereby. The arms 32 are shaped so as to curve around the sides of the rod 10d, their upper edges bearing against each other so as to hold their central portions in a fixed spaced relation, away from the said rod. Friction discs 15d similar to discs 15 are provided and friction arms 16d are disposed outside of the same having extensions 26d provided with inwardly extending lugs 30 which embrace the rod 10d, thereby holding the friction arms 16d against independent rotary movement. The friction arms 16d are formed on their inner faces similarly to the arm 16, illustrated and described with reference to the aforesaid Fig. 3, except for the extensions 26d, thus, with the arm members 32, forming enclosed pockets for the friction discs 15d, and packing 22d. A spring plate 29d is provided similarly as described with reference to the preceding modifications. The pin 11d passes through the reverse shaft arm 6d and the valve gear operating rod 10d as aforesaid and through the members 32, the friction discs 15d the friction arms 16d, and the spring plate 29d, the pin being provided with nuts 25d which when drawn up thereon hold the several elements tightly in position and force the friction arms 16d against the friction discs. It will be seen that by virtue of the aforedescribed construction a mechanism is provided which may be readily applied to existing structures and which functions in the same manner and with the same results as the mechanisms described with reference to the preceding figures.

Referring to Figs. 16 to 21 inclusive, there is here illustrated another modified form of the invention applicable as an attachment to a reverse shaft arm and valve gear operating rod on an existing valve gear structure of the usual type. The reverse shaft arm 6e is pivotally coupled at its upper end to the valve gear operating rod 10e, in the usual manner, a pin 11e, passing through the jointure. A substantially U-shaped yoke 34 is provided at the said jointure. The opposite sides of the yoke comprise circular disc members 35 and 36, having their inner faces welded as indicated at 37, to the valve gear operating rod 10e. The outer faces of the said members are formed with circular flanges 13e, and friction discs 15e are provided in the pockets formed by the flanges 13e in the same manner as described with reference to Figs. 1 to 4. Orifices 38 are formed in the side members 35 and 36 to permit the passage of the pin 11e, therethrough, and bushings 39, are disposed in the orifices. Friction arms 40 are provided opposite the outer faces of the side members of the yoke 34. The friction arms are formed on their inner faces with circular depressions, in the same manner as described with reference to the friction arms 16, of Fig. 3. Complete housings are thereby provided for the friction discs 15e, and seats are provided for packing rings 22e. The friction arms 40 have extensions 26e, which are coupled together at their lower ends by an anchor member 41. The anchor member comprises a rectangular body portion 42, having a groove 43 formed in one of its faces adapting the anchor to embrace the arm 6e to which the same is welded as indicated at 44. Dowels 45, are provided at the opposite ends of the anchor and extend into orifices 46, formed in the ends of the friction arms 40, to make the aforesaid coupling. A spring plate 29e is provided similarly as described with reference to Figs. 5 and 6. The pin 11e, passes through the arm and rod, and the U-shaped member as aforesaid, and through the friction discs, the friction arms and the spring plate, the said pin being provided with nuts 25e, which when drawn up thereon hold the several elements tightly in position, the friction arms 40 being forced against the friction discs 15e, and the friction arms 40, being held by the anchor 41, against independent rotary movement. It will be seen that a mechanism is thus provided which may be readily applied to existing structures, which functions in the same manner as the mechanisms described with reference to the preceding figures, and which presents a device comprised of a minimum number of parts and characterized by simplicity, sturdiness and durability, while at the same time being capable of a maximum efficiency in operation.

While there has been herein described preferred embodiments and modifications of the invention, it will be understood that many and various changes in the form and details of construction thereof may be made without departing from the spirit of the invention and that all and any such changes and modifications as fall within the scope of the appended claim are contemplated as a part of this invention.

The invention claimed and desired to be secured by Letters Patent is:

In a locomotive the combination of a valve gear mechanism; a reverse gear mechanism including a reciprocating element reciprocated by power fluid to adjust said valve gear mechanism and reversible by power fluid to reverse the direction of operation of said locomotitve, said element being elastically held in adjusted position by said power fluid; a pair of members pivotally connected together, one of said members being pivotally connected to a fixed part of said locomotive, one of said members being pivotally connected with said valve gear mechanism, and the other of said members being pivotally connected with said power fluid actuated element, whereby shocks from said valve gear mechanism will be transmitted, by change in angularity of the respective pivotal connections, to said power fluid actuated element to displace said power fluid actuated element; and a friction device associated with one of said pivotal connections to resist said change in said angularity to minimize the displacement of said power fluid actuated element by said shocks.

JAMES G. BLUNT.